United States Patent [19]

Chan et al.

[11] Patent Number: 5,712,450

[45] Date of Patent: Jan. 27, 1998

[54] SPLASH GUARD FOR WIRING DEVICES

[75] Inventors: David Chan, Bellerose, N.Y.; Paul Gernhardt, Chesapeake, Va.

[73] Assignee: Leviton Manufacturing Co., Inc., Little Neck, N.Y.

[21] Appl. No.: 692,158

[22] Filed: Aug. 5, 1996

[51] Int. Cl.⁶ .................................................. H05K 5/03
[52] U.S. Cl. ...................... 174/66; 220/241; 200/302.2; 200/302.3
[58] Field of Search ............... 174/66, 67; 220/241, 220/242; 200/302.2, 302.1, 302.3, 333; D8/353; D13/177

[56] References Cited

U.S. PATENT DOCUMENTS

| | | | |
|---|---|---|---|
| 2,984,725 | 5/1961 | Hubbell et al. | 174/66 X |
| 3,188,438 | 6/1965 | Lovasco | 174/66 X |
| 3,676,626 | 7/1972 | Mitchell | 200/302.2 X |
| 3,928,742 | 12/1975 | Rule | 200/302.3 |
| 3,967,085 | 6/1976 | Lockard et al. | 200/302.2 |
| 5,575,380 | 11/1996 | Imai | 200/302.2 |

FOREIGN PATENT DOCUMENTS 2140623  11/1984  United Kingdom ............ 200/302.2 X

*Primary Examiner*—Kristine L. Kincaid
*Assistant Examiner*—Dean A. Reichard
*Attorney, Agent, or Firm*—Paul J. Sutton

[57] ABSTRACT

The device of the invention is a seal to close off the spaces between operating devices, such as, buttons and their housing and the spaces between the housing and the cover plate placed over the operating device. The seal has a raised portion into which the operating devices extend so they can be operated from outside the seal. The passage of the seal over the operating device seals operating device/housing spaces. The perimeter of the seal is arranged to engage the housing and cover plate to seal the housing/cover plate spaces.

7 Claims, 4 Drawing Sheets

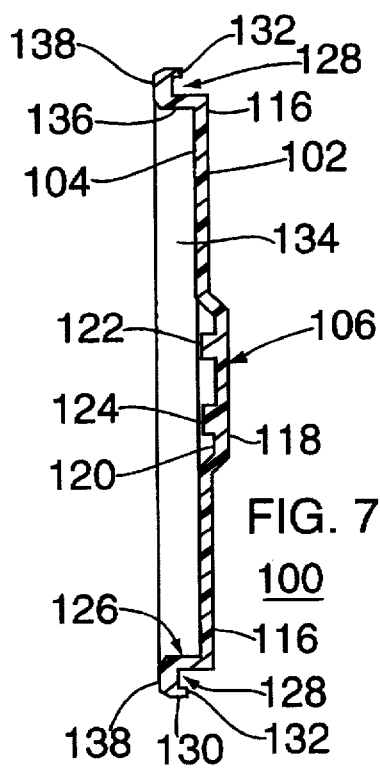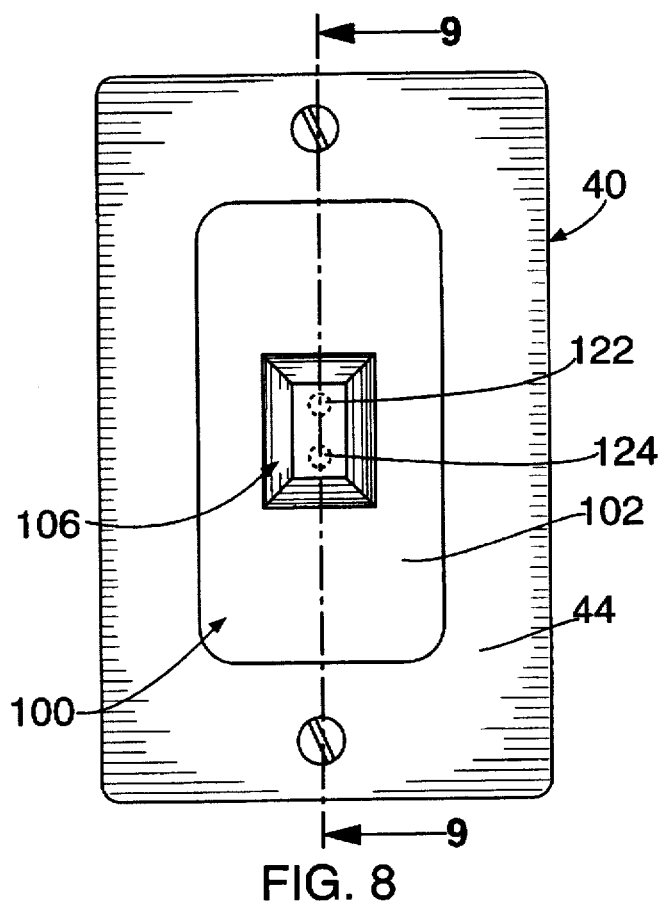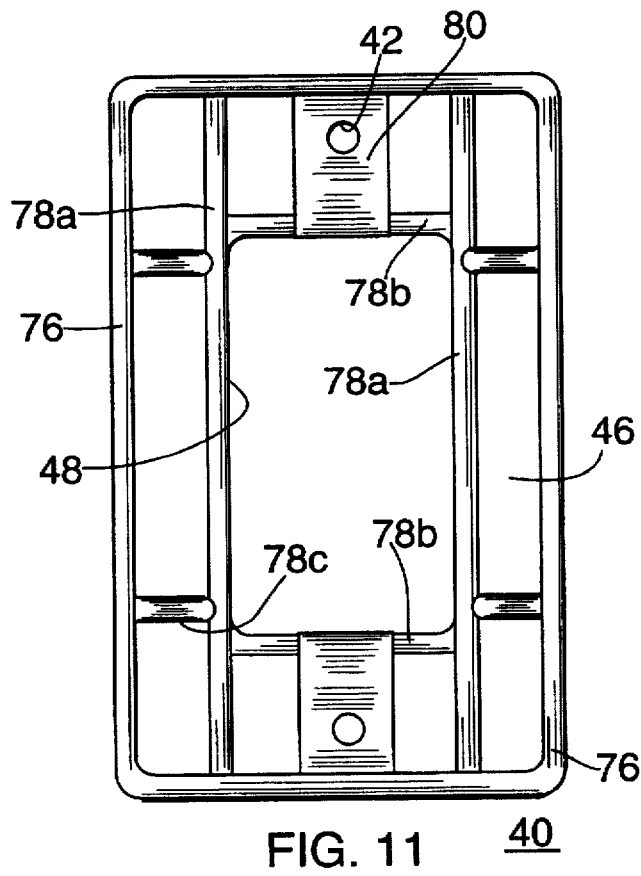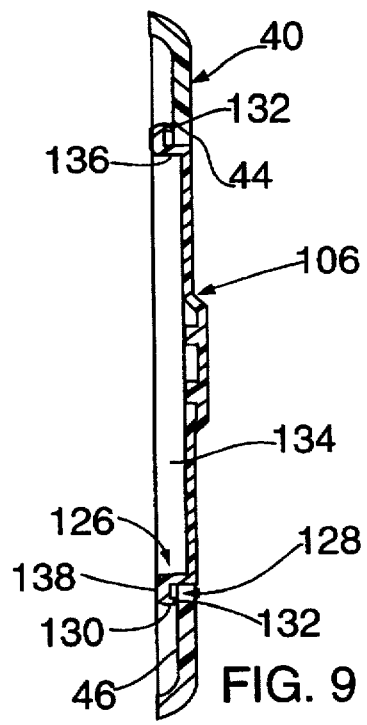

1

SPLASH GUARD FOR WIRING DEVICES

BACKGROUND OF THE INVENTION

1. Field of the Invention

The invention is directed environmental seals for wiring devices and more particularly to a seal which can be fitted or retrofitted on an electrical wiring device to prevent the entry of moisture or other debris.

2. Description of the Prior Art

One known device is used to prevent cold air from entering a house or the like through a wall mounted wiring device. This device uses a blank of insulating material, cut to the dimensions of the inside of the cover plate, with appropriate cut-outs (i.e. switch, duplex receptacle) and holes for the mounting screws. If properly installed there is some blockage of heat transfer but the insulating material will not provide an environmental seal.

Another approach is to put the electrical wiring device in a waterproof housing. Although there are rubber and cork seals in the box around the housing edges which contact the movable cover, there are no seals once the debris gets into the housing. The housing is quite large and is usually surface mounted so it takes up a great deal of room and is generally unsightly.

SUMMARY OF THE INVENTION

The present invention overcomes the difficulties noted above with respect to the prior art devices by providing an environmental seal about the electrical wiring device which seals the possible spaces between operative buttons, bars or the like as well as the spaces between the wiring device and its cover plate. This is done by providing a shield of a flexible, resilient material which fits about the entire front face of the wiring device and the front part of the top, bottom and two side surfaces. A domed area in the seal allows the user to operate the buttons and bars of the wiring device with ease. Protuberances formed on the under surface of the dome improve the user's ability to operate through the seal. The seal covers the spaces between the button, bars, etc. and the housing of the wiring device. The seal, at its periphery, has additional members which are compressed as the cover plate is tightened to the ears of a gang box through an aperture in the wiring device mount. The presence of the seal between the periphery of the wiring device and aperture of the cover plate as well as the compression of the seal edge members seals the spaces between the wiring device and the cover plate. It is an object of the invention to provide an environmental seal for an electrical wiring device.

It is an object of the invention to provide a novel environmental seal which can be used on new installations of wiring devices or on the retrofit of existing installations.

It is still another object of this invention to provide a seal made of flexible, resilient material:

It is still another object of this invention to provide a novel environmental seal which is small in size.

It is yet another object of this invention to provide a novel seal which covers the wiring device but allows the wiring device to be operated therethrough.

It is yet another object of this invention to provide a novel seal made of flexible and resilient material and which has a dome through which components of a wiring device can be operated.

It is still another object of this invention to provide a small seal made of flexible, resilient material which is small in size but can extend beyond a wiring device's periphery to seal spaces between the wiring device and its cover plate while sealing all spaces between operative buttons and bars of a wiring device while permitting their operation through a dome.

Other objects and features of the invention will be pointed out in the following description and claims and illustrated in the accompanying drawings, which disclose, by way of example, the principles of the invention, and the best mode which is presently contemplated for carrying it out.

BRIEF DESCRIPTION OF THE DRAWINGS

In the drawings in which similar elements are given similar reference characters:

FIG. 7 is a side elevational view, in section, of the environmental seal of FIG. 5 taken along the line 7—7.

FIG. 8 is a top plan view of a cover plate positioned upon the environmental seal of FIG. 5.

FIG. 9 is a side elevational view, in section, of the environmental seal and cover plate of FIG. 8 taken along the line 9—9.

FIG. 11 is a plan view of the back of the cover plate of FIG. 2.

DESCRIPTION OF THE PREFERRED EMBODIMENTS

Figure 1:
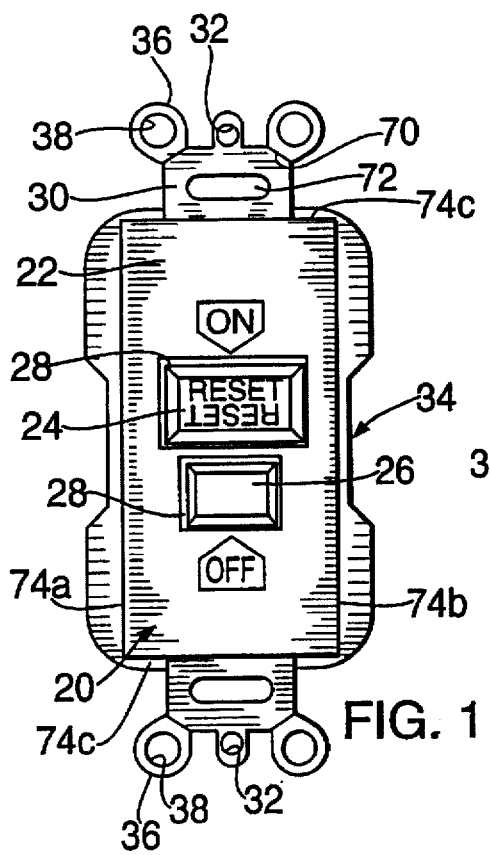
FIG. 1 is a top plan view of an electrical wiring device.

Turning now to FIGS. 1 to 4 and 11, there is shown the installation of a wiring device 20 with a cover plate 40 to the ears 52 of a standard single gang box 50. The ears 52 have threaded apertures 54 to receive in threaded engagement the mounting screws 56 which pass through apertures 42 in cover plate 40 and apertures 32 in mounting strap 30.

The particular wiring device shown herein is a ground fault circuit interrupter of the type sold by Leviton Manufacturing Co., Inc. catalog No. 6490. However, the present invention is equally applicable to other wiring devices such as push button, rocker-type or toggle operated switches, dimmer controls, motor speed controls, etc.

The ground fault circuit interrupter or GFCI 20 has a front panel 22 in which are set a reset on button 24 and an off button 26. In order to be able to depress these buttons, it is necessary to leave spaces such as 28 between the buttons 24, 26 and the surrounding portion of front panel 22. These spaces 28 permit moisture and various types of debris to enter the main body 34 which houses the circuit interrupter circuits (not shown). A mounting strap 30 extends behind front panel 22 and as described above has apertures 32 therethrough. Additional ears 36 with apertures 38 therethrough may be used to engage the single gang box 50 or the wall about the single gang box 50, or other supports or, if desired, may be broken off along the weakened lines 70. A mounting slot 72 is also placed in mounting strap 30.

The front panel 22 of the GFCI 20 is smaller than the main body 34 resulting in steps 74a and 74b adjacent the two side walls of main body 34. There are small steps 74c adjacent the top wall and bottom wall of main body 34. Turning to FIG. 11, the rear face 46 of cover plate 40 is shown. A low wall 76 extends completely along the outer edge of cover plate 40 and perpendicular to it. Strengthening ribs 78a extend to each side of wiring device access aperture 48 between wall 76 adjacent the top edge to wall 76 adjacent the bottom edge of cover plate 40. Cross ribs 78b extend along the top and bottom edges of aperture 48 between ribs 78a. Additional cross ribs 78c extend between the ribs 78a and wall 76 along the side edges of wall 76. The steps 74a, 74b, and 74c as well as the mounting strap 30 are aligned with some of the ribs 78a and 78b. A reinforced area 80 is placed about the apertures 42.

Figure 2:
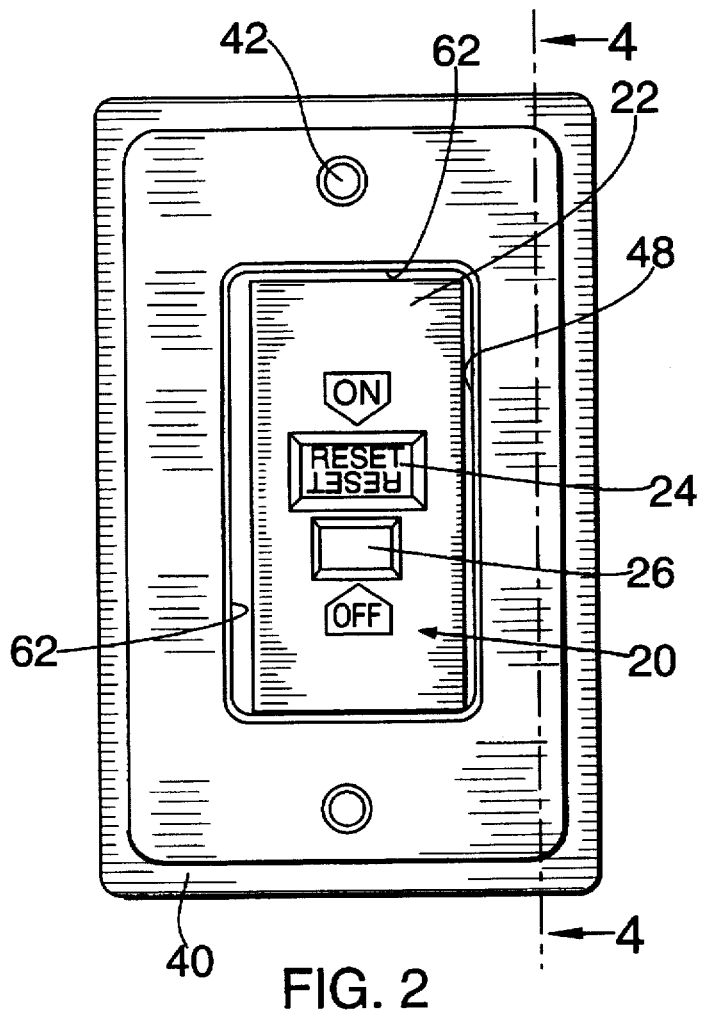
FIG. 2 is a top plan view of the electrical wiring device of FIG. 1 with a cover plate thereover.
Figure 3:
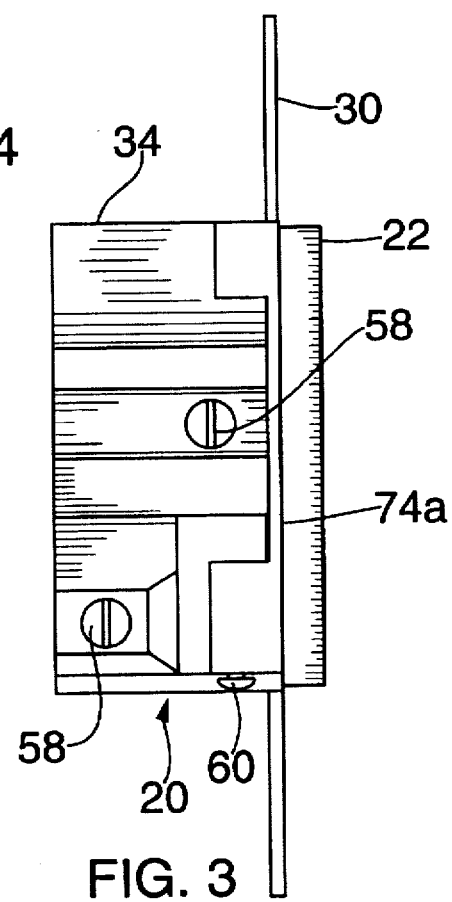
FIG. 3 is a side elevational view of the electrical wiring device of FIG. 1.

Because the cover plate 40 is used with a variety of wiring devices and because there must be a clearance to permit the cover plate 40 to be easily installed upon or removed from a wiring device such as GFCI 20, the tolerance between these parts results in spaces 62 between some portion of the body 34 of wiring device 20 and the cover plate 40 (see FIG. 2). These spaces 62 permit moisture or debris to enter the gang box 50 and interfere with or prevent the operation of the GFCI 20. These materials could also short out the wires connected to GFCI 20. Terminal screws 58 (see FIG. 3) have the white or neutral conductors (not shown) connected to them. On the other side of body 34 (not visible in FIG. 3) similarly positioned terminal screws have the hot or black conductors (not shown) connected to them. The ground or green conductor (not shown) is connected to terminal screw 60.

Referring now to FIGS. 5 to 10, a seal 100, constructed according to the concepts of the invention is shown. Seal 100 has a front face 102 and a rear face 104. A truncated pyramid 106 having a rectangular base 108 rises out of the center of seal 100. The long edges 110 of the pyramid 106 are parallel to each other and to the long edges 112 of the seal. The short edges 114 of the pyramid 106 are parallel to each other and to the short edges 116 of seal 100.

Figure 5:
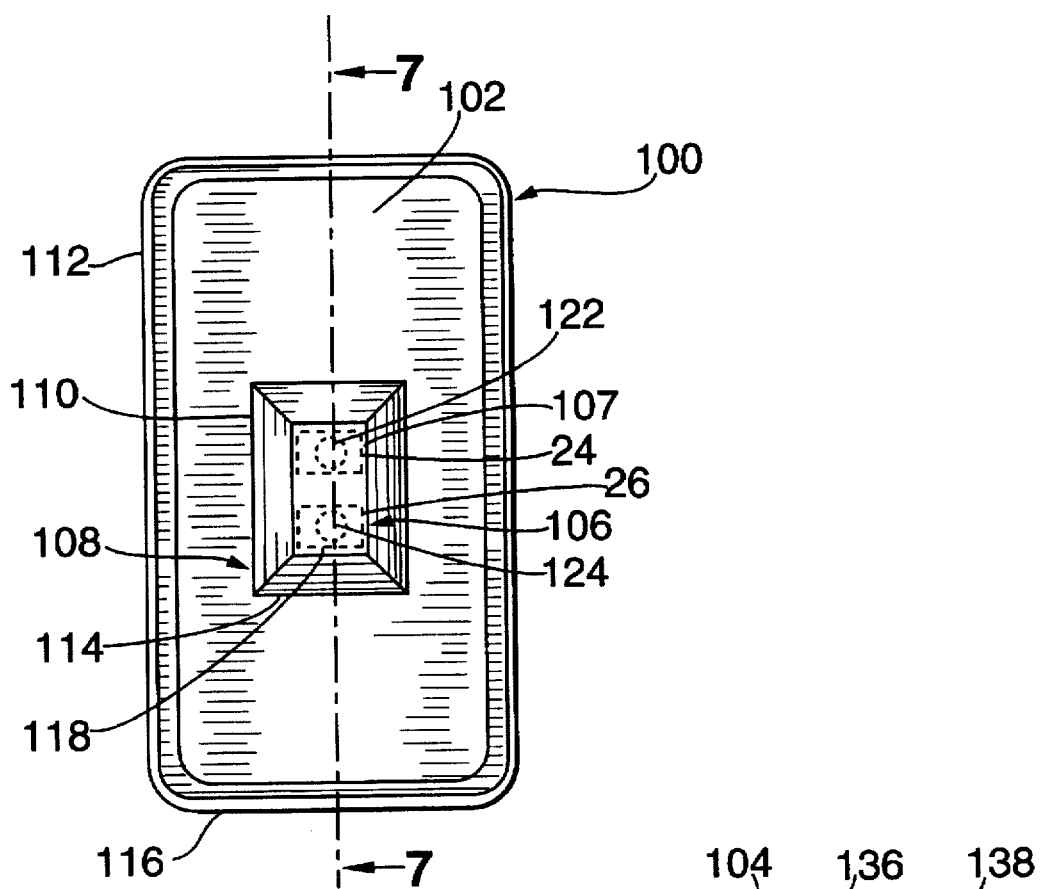
FIG. 5 is a top plan view of an environmental seal constructed in accordance with the concepts of the invention.
Figure 6:
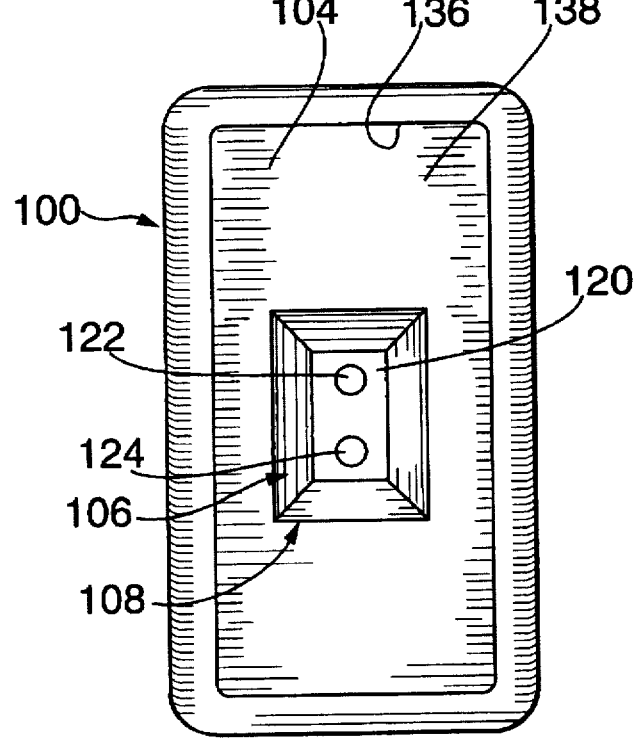
FIG. 6 is a bottom plan view of environmental seal of FIG. 5.

The roof 107 of the truncated pyramid 106 has an outer surface 118 and an inner surface 120. The roof 107 is parallel to the front face 102 of seal 100. The height of the truncated pyramid 106, as well as, the length and width of the base 108 is determined by the size, shape and placement of the buttons, the rocker switch surfaces, bars, etc. of the wiring device. As shown in FIG. 5, the buttons 24 and 26 of the GFCI 20 are within the truncated pyramid 106.

The seal 100 is made of genuine or synthetic rubber, PVC, nylon, elastomeric or plastic materials which are flexible and resilient. The user of the GFCI 20 can operate the buttons 24 and 26 through the seal pyramid 106 because of the flexibility of the seal material which returns to its initial position once any applied force is removed. The projection, which in the embodiment shown is a truncated pyramid, may take any desired shape or may be more than one projection as with a push button switch which may consist of two cylindrical projections.

Depending upon where the user pushes with respect to buttons 24 and 26, how much force is applied and the degree of displacement of pyramid, the buttons 24 and 26 may not be properly depressed to cause the wiring device to take its desired position. To be sure that the forces applied to the pyramid are transmitted to the desired button, two cylindrical projections are placed on the inner surface 120 of roof 107 of the truncated pyramid 106. Cylindrical member 122 is aligned with button 24 and cylindrical member 124 is aligned with button 26. When the outer surface 118 of the roof 107 is depressed the cylindrical members 122, 124 more completely transmit the applied force and position it over the button so that the force transmitted is correctly applied to the button. The cylindrical members 122 and 124 do not engage their respective buttons but their ends are close to them so that they engage their respective buttons shortly after surface 118 is depressed. The cylindrical members 122 and 124 concentrate the applied force to operate the respective buttons.

Figure 10:
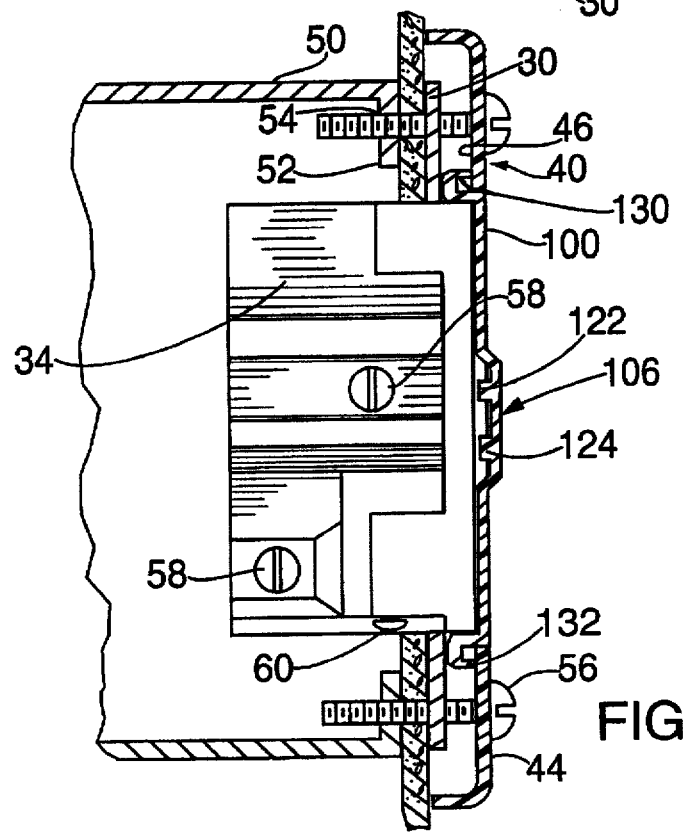
FIG. 10 is a side elevational view, partially in section, of an environmental seal, a wiring device and a cover plate assembled by means of screw fasteners.

Returning now to FIGS. 5 to 7 and 9, there is shown a wall 126 which extends along the entire perimeter of seal 100, perpendicular to and extending away from rear face 104 of seal 100. At the free end of wall 126 is placed an outwardly directed rim 128 which is perpendicular to wall 126. At the free end of rim 128 is another wall 130 shorter than wall 126, perpendicular to and extending towards rear face 104 of seal 100. The free end 132 of wall 130 is made to engage the rear surface 46 of cover plate 40 or the ribs 78a, 78b or a combination of such ribs and the rear surface 46 of cover plate 40. Because of the material from which seal 100 is made and the freedom of movement of free end 132 of wall 130, a seal of seal 100, with the cover plate 40, can be easily achieved. As shown in FIG. 10, the wall 130 is trapped between the rear face 46 of cover plate 40 and the mounting strap 30. As the mounting screws 56 are tightened, the cover plate 40 is drawn towards seal 100 and the walls 130 flex to conform to the rear face 46 and the ribs 78a and 78b providing a seal.

The rear face 104 of seal 100 is generally flat except where the pyramid 106 is formed. The result of the formation made up of wall 126, rim 128 and wall 130 is to create a cavity 134 bounded by the back surface 136 of wall 126. The cavity 134 is so dimensioned and shaped that it fits over front panel 22 and extends toward the GFCI 20 side steps 74a, 74b and the end steps 74c. The small spaces created by the separation of the back of rim 128 and steps 74a, 74b and 74c provides clearance for the flexure of the seal elements 126, 128 and 130.

Figure 4:
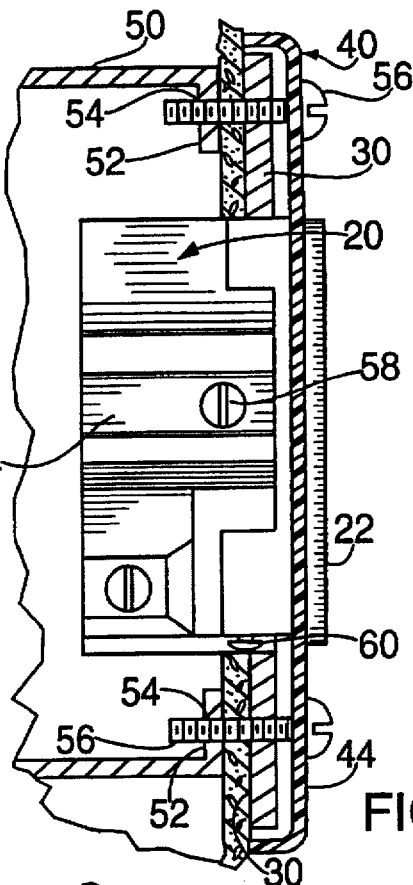
FIG. 4 is a side elevational view of an electrical wiring device with a cover plate as shown in FIG. 2 with the cover plate in section taken along the line 4—4 of FIG. 2.

The seal 100 is shown in place in cover plate 40 in FIGS. 8 and 9. Unlike the position of front panel 22 of GFCI 20 in cover plate 40 without the seal 100 as shown in FIG. 4, where the front panel 22 of GFCI 20 extends beyond the front face 44 of cover plate 40, the from panel 22 with the seal 100 attached does not reach even the rear face 46 of the cover plate 40. The front face 102 of seal 100 is in the same plane as the front face 44 of cover plate 40 and the front panel 22 of the GFCI 20 is in position on the back surface 138 of rim 128.

To employ the seal 100, it is first applied over front panel 22 of the GFCI 20. By the careful dimensioning of the seal 100 and employing its flexibility and resiliency, it can be stretched so that it can be placed on the GFCI 20. Once in place, the seal attempts to recover its original size and shape and strongly grips all the sides of the front panel 22. At this point the spaces 28 around buttons 24 and 26 are sealed. The GFCI 20 with seal 100 in place is now placed in wiring device access aperture 48 of cover plate 40. The body 34 of GFCI 20 is then placed in the single gang box 50 and each of the apertures 42 in cover plate 40 are aligned with associated apertures 32 in the mounting strap 30 and an associated one of the threaded apertures 54 in the gang box mounting ears 52. Threaded fasteners 56 are passed through aligned apertures 42 and 32 and made to threadably engage the threaded aperture 54 of the gang box mounting ears 52. As fasteners 56 are advanced and cover plate 40 advances towards GFCI 20, the members 126, 128 and 130 of seal 100 are distorted as required to make a tight seal with rear face 46 of cover plate 40 and with the ribs 78a and 78b as shown in FIG. 10. As a result of the position of the seal 100 and the members 126, 128 and 130, the spaces 62, as shown in FIG. 2 are sealed.

While there have been shown and described and pointed out the fundamental novel features of the invention as applied to the preferred embodiment, it will be understood that various omissions and substitutions and changes of the form and details of the device illustrated and in it its operation may be made by those skilled in the art, without departing from the spirit of the invention.

What is claimed is:

1. A splash guard for wiring devices to prevent moisture or debris from entering into or about a wiring device comprising:
   a) a wiring device having a front face of a first predetermined periphery, a rear face, two side faces, a top face and a bottom face so assembled as to provide a six-sided enclosure for the operative components of said wiring device, said front face intended to project into an aperture in a cover plate placed over said wiring device;
   b) at least one mounting tab, having at least one first aperture through each of said at least one mounting tab, on said wiring device for attaching said device to a support;
   c) one or more movable operating means extending through said front face for engagement and operation of said one or more movable operating means by a user;
   d) one or more first spaces between each of said one or more movable operating means and said front face of said wiring device, which may permit moisture and debris to enter said enclosure and impede or prevent the proper operation of said wiring device;
   e) a cover plate of a second predetermined periphery larger than said first periphery having a from face and a rear face and at least one second aperture and at least one wiring device aperture therethrough from said front face to said rear face having a third predetermined periphery greater than said first predetermined periphery and less than said second predetermined periphery into which at least said front face of said wiring device may extend;
   f) one or more second spaces between said first periphery of said front face of said wiring device and the third periphery of its associated one of said at least one wiring device aperture which may permit moisture and debris to enter said enclosure and impede or prevent the proper operation of said wiring device;
   g) flexible, resilient seal means extending over the entirety of said front face of said wiring device to prevent moisture and debris from passing through said one or more first spaces, said seal means further extending beyond said third periphery of said at least one wiring device aperture to prevent moisture and debris from passing through said one or more second spaces into and about said wiring device enclosure to impede or prevent proper operation of said wiring device; and
   h) at least one fastening means extending through said at least one second aperture in said cover plate and an associated one of said at least one first aperture in said at least one mounting tab into said support whereby said seal means is held in place on said wiring device by the compression of said seal means between said front face of said wiring device and said rear face of said cover plate.

2. A splash for wiring devices as defined in claim 1, wherein said seal means further comprises:
   a) a front surface and a rear surface substantially parallel with said front surface;
   b) a projection extending outwardly from said seal means front surface; and
   c) said projection being dimensioned and configured to provide access to said one or more movable operating means to facilitate manipulation of said one or more movable operating means through said seal means.

3. A splash guard for wiring devices as defined in claim 2, wherein said projection has a front surface for contact by a user to move said one or more movable operating means; and
   a) said rear surface of said seal means having at least one protrusion thereon, said at least one protrusion aligned with at least one of said one or more movable operating means having free end which is spaced a short distance from said at least one or said one or more movable operating means;
   b) said at least one protrusion free end brought into contact with its associated at least one of said one or more movable operating means to assist in moving said at least one of said one or more movable operating means in response to depression of said front surface of said seal means by a user.

4. A splash guard for wiring devices as defined in claim 2, wherein said projection is in the form of a truncated pyramid having a rectangular base and a truncated top surface and said truncated top surface is parallel to said front face of said seal means.

5. A splash guard for wiring devices to prevent moisture or debris from entering into or about a wiring device comprising:
   a) a wiring device having a front face, a rear face, two side faces, a top face and a bottom face so assembled as to provide a six-sided enclosure for the operative components of said wiring device;
   b) at least one mounting tab, having at least one first aperture through each of said at least one mounting tab, on said wiring device for attaching said device to a support;
   c) one or more movable operating means extending through said front face for engagement and operation of said one or more movable operating means by a user;
   d) one or more first spaces between each of said one or more movable operating means and said front face of said wiring device, which may permit moisture and debris to enter said enclosure and impede or prevent the proper operation of said wiring device;
   e) a cover plate having a front face and a rear face and at least one second aperture and at least one wiring device aperture through which at least said front face of said wiring device may extend;
   f) one or more second spaces between a periphery of said front face of said wiring device and its associated one of said at least one wiring device aperture which may permit moisture and debris to enter said enclosure and impede or prevent the proper operation of said wiring device;

g) flexible, resilient seal means extending over the entirety of said front face of said wiring device to prevent moisture and debris from passing through said one or more first spaces, said seal means further extending about the periphery of said front face of said wiring device to prevent moisture and debris from passing through said one or more second spaces into and about said wiring device enclosure to impede or prevent proper operation of said wiring device;

h) at least one fastening means extending through said at least one second aperture in said cover plate and an associated one of said at least one first aperture in said at least one mounting tab into said support whereby said seal means is held in place on said wiring device by the compression of said seal means between said front face of said wiring device and said rear face of said cover plate;

said seal means further comprising:

i) a front surface and a rear surface substantially parallel with said front surface;

j) a projection extending outwardly from said seal means front surface;

k) said projection being dimensioned and configured to provide access to said one or more movable operating means to facilitate manipulation of said one or more movable operating means through said seal means;

l) said seal means has a first wall extending from said seal means rear surface and terminating in a free end, said first wall forming an enclosed region with an open rear face; and m) said enclosed region being dimensioned and adapted to receive therein said front face and a portion of each of the two side faces, said top face and said bottom face.

6. A splash guard for wiring devices as defined in claim 5, further comprising:

a) an outward extension, terminating in a free end, and connected to the free end of said first wall and extending in a plane parallel to said seal means front face.

7. A splash guard for wiring devices as defined in claim 6, further comprising:

a) a second wall extending completely about the free end of said outward extension and in parallel, spaced apart relation to said first wall; said second wall having a free end and being shorter than said first wall; said second wall being compressed between the back face of said cover plate and the front face of said wiring device as said at least one fastening means is advanced into said support whereby said one or more second spaces are sealed.

* * * * *